United States Patent
Townsend et al.

(10) Patent No.: US 7,634,098 B2
(45) Date of Patent: Dec. 15, 2009

(54) METHODS, DEVICES, AND COMPUTER PROGRAM PRODUCTS FOR OPERATING A MOBILE DEVICE IN MULTIPLE SIGNAL PROCESSING MODES FOR HEARING AID COMPATIBILITY

(75) Inventors: Michael Townsend, Durham, NC (US); William Chris Eaton, Cary, NC (US)

(73) Assignee: Sony Ericsson Mobile Communications, AB, Lund (SE)

( * ) Notice: Subject to any disclaimer, the term of this patent is extended or adjusted under 35 U.S.C. 154(b) by 914 days.

(21) Appl. No.: 11/188,559

(22) Filed: Jul. 25, 2005

(65) Prior Publication Data

US 2007/0036373 A1 Feb. 15, 2007

(51) Int. Cl.
H04R 25/00 (2006.01)
(52) U.S. Cl. .................. 381/321; 381/312; 381/331
(58) Field of Classification Search ................. 381/312, 381/321, 331
See application file for complete search history.

(56) References Cited

U.S. PATENT DOCUMENTS

| 5,842,115 | A | 11/1998 | Dent |
| 6,122,500 | A | 9/2000 | Dent et al. |
| 6,658,126 | B1 | 12/2003 | Stern |
| 7,248,713 | B2 * | 7/2007 | Bren et al. .................. 381/331 |
| 2003/0059076 | A1 | 3/2003 | Martin |
| 2004/0037443 | A1 | 2/2004 | Beimel et al. |

FOREIGN PATENT DOCUMENTS

| DE | 10223544 C1 | 7/2003 |
| EP | 1196008 A2 | 4/2002 |
| EP | 1296537 A2 | 3/2003 |
| EP | 1379103 A2 | 1/2004 |
| EP | 1416765 A2 | 5/2004 |
| JP | 09018998 | 1/1997 |
| JP | 10126466 A2 | 5/1998 |

OTHER PUBLICATIONS

Notification of Transmittal of the International Search Report and the Written Opinion of the International Searching Authority, or the Declaration corresponding to PCT/US2006/012814 mailed on Oct. 18, 2006.

* cited by examiner

*Primary Examiner*—Brian Ensey
(74) *Attorney, Agent, or Firm*—Myers Bigel Sibley & Sajovec, P.A.

(57) ABSTRACT

An audio signal received at a mobile device is processed using a first set of equalization parameters in an acoustic coupling mode of operation, and is processed using a second set of equalization parameters in an inductive coupling mode of operation. The processed audio signal is transmitted to a speaker associated with the mobile device for acoustic coupling to a human ear and/or a hearing aid microphone, or for inductive coupling to a hearing aid telecoil.

30 Claims, 5 Drawing Sheets

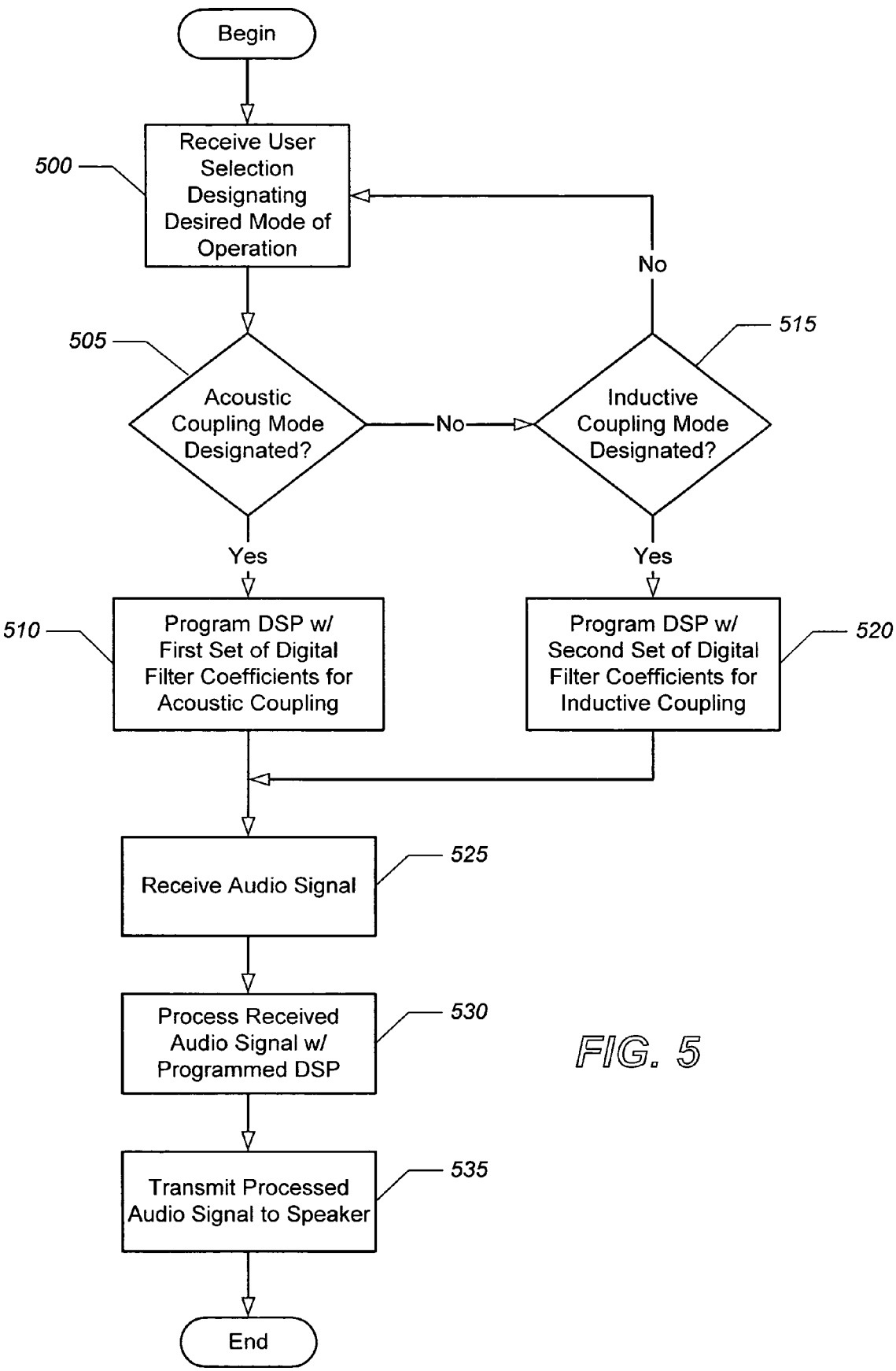

METHODS, DEVICES, AND COMPUTER PROGRAM PRODUCTS FOR OPERATING A MOBILE DEVICE IN MULTIPLE SIGNAL PROCESSING MODES FOR HEARING AID COMPATIBILITY

BACKGROUND OF THE INVENTION

The present invention relates to electronic devices, and, more particularly, to mobile electronic devices that can be used by persons with a hearing impairment and methods of operating the same.

The gradual loss of hearing that occurs as a person ages is a relatively common condition. An estimated one-third of Americans older than age 60 and one-half of those older than age 75 have a hearing impairment. Over time, noise may contribute to hearing loss by damaging the cochlea, which is a part of the inner ear. Other factors, such as blockage due to earwax, may reduce the ability of the ear to detect certain sounds or frequencies. Although inner ear damage may not be reversed, a person experiencing hearing loss may be fitted with a hearing aid, which may improve the person's hearing.

It may be desirable for mobile electronic devices, such as mobile terminals, to be hearing aid compatible. In fact, the hearing aid compatibility of certain devices has been mandated in the United States by the U.S. Federal Communications Commission (FCC). One problem experienced when using a hearing aid in conjunction with other devices is that the microphone inside a hearing aid may be susceptible to noise from the surrounding environment. For example, it may be difficult for a hearing aid user to hear an audio signal broadcast from a telephone handset speaker, due to the background and/or environmental noise that is also picked-up by the hearing aid microphone.

Accordingly, hearing aids have been developed that provide alternatives to conventional acoustic coupling to the hearing aid microphone (i.e., by placing the device broadcasting the audio signal adjacent to the hearing aid) for receiving an audio signal from other devices. For example, many hearing aids currently include a telecoil, also referred to as a "T-coil". The telecoil is an induction coil inside the hearing aid that converts magnetic energy to electrical energy. When a hearing aid is switched to the "T" position, the hearing aid microphone may be deactivated, and the telecoil may permit a hearing aid user to inductively couple other devices to the hearing aid. For example, the telecoil may pick-up the audio signal magnetic field emitted by a voice coil in a conventional landline telephone handset speaker, and may transform the magnetic field into a boosted audio signal that can be heard by the hearing aid user. As such, environmental and/or background noise may not transmitted to the hearing aid user when the telecoil is used.

However, when used with a mobile terminal, such as a digital cellular phone, baseband interference from the phone's electronics and radio frequency (RF) interference due to emissions from the phone's antenna may result in magnetic field noise. This magnetic field noise may be picked-up by the telecoil and transmitted to the hearing aid user. For example, in TDMA-type air interfaces, the signal-to-noise ratio for telecoil inductive coupling may be poor. As such, telecoil usability may suffer, which may impede the use of digital cellular phones by hearing aid users.

SUMMARY OF THE INVENTION

According to some embodiments of the present invention, a method of operating a mobile device includes receiving an audio signal. The received audio signal is processed using a first set of equalization parameters in an acoustic coupling mode of operation, and is processed using a second set of equalization parameters in an inductive coupling mode of operation. The processed audio signal is transmitted to a speaker associated with the mobile device.

In some embodiments, processing the received audio signal using the first set of equalization parameters may include adjusting frequency levels of the received audio signal based on a desired frequency response for a hearing aid microphone and/or a human ear, for example, by amplifying frequencies above about 2000 Hz and frequencies below about 800 Hz and attenuating frequencies therebetween. Processing the received audio signal using the second set of equalization parameters may include adjusting the frequency levels of the received audio signal based on a desired frequency response for a hearing aid telecoil, for example, by attenuating frequencies above about 2000 Hz and frequencies below about 800 Hz and amplifying frequencies therebetween.

In other embodiments, adjusting the frequency levels based on a desired frequency response for the telecoil may include maintaining the frequency levels of the received audio signal when the desired frequency response for the telecoil matches the frequency response of the speaker.

In some embodiments, the first set of equalization parameters may be a first set of digital filter coefficients configured for acoustic coupling to a hearing aid microphone and/or a human ear, and the second set of equalization parameters may be a second set of digital filter coefficients configured for inductive coupling to a hearing aid telecoil. The received audio signal may be processed using one of the first set and the second set of digital filter coefficients based on a user selection designating one of the acoustic coupling mode of operation and the inductive coupling mode of operation. More particularly, a digital signal processor may be programmed with one of the first set and the second set of digital filter coefficients responsive to receiving the user selection, and the received audio signal may be processed using the programmed digital signal processor. In other embodiments, the hearing aid telecoil may be detected within a vicinity of the mobile device, and the received audio signal may be processed using the second set of digital filter coefficients responsive to detection of the hearing aid telecoil.

According to further embodiments of the present invention, a mobile device includes a signal processor and a speaker coupled to the signal processor. The signal processor includes an acoustic coupling mode of operation and an inductive coupling mode of operation. The signal processor is configured to receive an audio signal, and is configured to process the received audio signal using a first set of equalization parameters in the acoustic coupling mode of operation, and using a second set of equalization parameters in the inductive coupling mode of operation. The speaker is configured to broadcast the processed audio signal.

In some embodiments, the signal processor may be configured to adjust frequency levels of the received audio signal based on a desired frequency response for a hearing aid microphone and/or a human ear in the acoustic coupling mode of operation. For example, the signal processor may be configured to amplify frequencies above about 2000 Hz and frequencies below about 800 Hz and attenuate frequencies therebetween in the acoustic coupling mode of operation. The signal processor may also be configured to adjust the frequency levels of the received audio signal based on a desired frequency response for a hearing aid telecoil in the inductive coupling mode of operation. For example, the signal processor may be configured to attenuate frequencies above about 2000 Hz and frequencies below about 800 Hz and amplify frequencies therebetween in the inductive coupling mode of operation.

In other embodiments, the signal processor may be configured to maintain the frequency levels of the received audio signal in the inductive coupling mode of operation when the desired frequency response for the telecoil matches the frequency response of the speaker.

In some embodiments, the signal processor may be a digital signal processor including at least one digital filter therein. As such, the first set of equalization parameters may be a first set of digital filter coefficients configured for acoustic coupling to a hearing aid microphone and/or a human ear, and the second set of equalization parameters may be a second set of digital filter coefficients configured for inductive coupling to a hearing aid telecoil.

In other embodiments, the device may include a user interface coupled to the digital signal processor. The user interface may be configured to receive a user selection designating one of the acoustic coupling mode of operation and the inductive coupling mode of operation. The digital signal processor may be configured to process the received audio signal using one of the first set and the second set of digital filter coefficients based on the user selection. More specifically, the digital signal processor may be configured to be programmed with one of the first set and the second set of digital filter coefficients responsive to the user selection.

In some embodiments, the device may further include a hearing aid detector that may be configured to detect the hearing aid telecoil within a vicinity of the mobile device. The digital signal processor may be configured to process the received audio signal using the second set of digital filter coefficients responsive to detection of the hearing aid telecoil.

In other embodiments, the mobile device may be a cellular telephone, a portable radio, and/or a portable music player.

Although described above primarily with respect to method and mobile device aspects of the present invention, it will be understood that the present invention may be embodied as mobile devices, methods, and/or computer program products.

BRIEF DESCRIPTION OF THE DRAWINGS

FIGS. 4 and 5 are flowcharts illustrating exemplary methods for operating a mobile device in multiple signal processing modes in accordance with some embodiments of the present invention.

DETAILED DESCRIPTION OF EMBODIMENTS OF THE INVENTION

Figure 1:
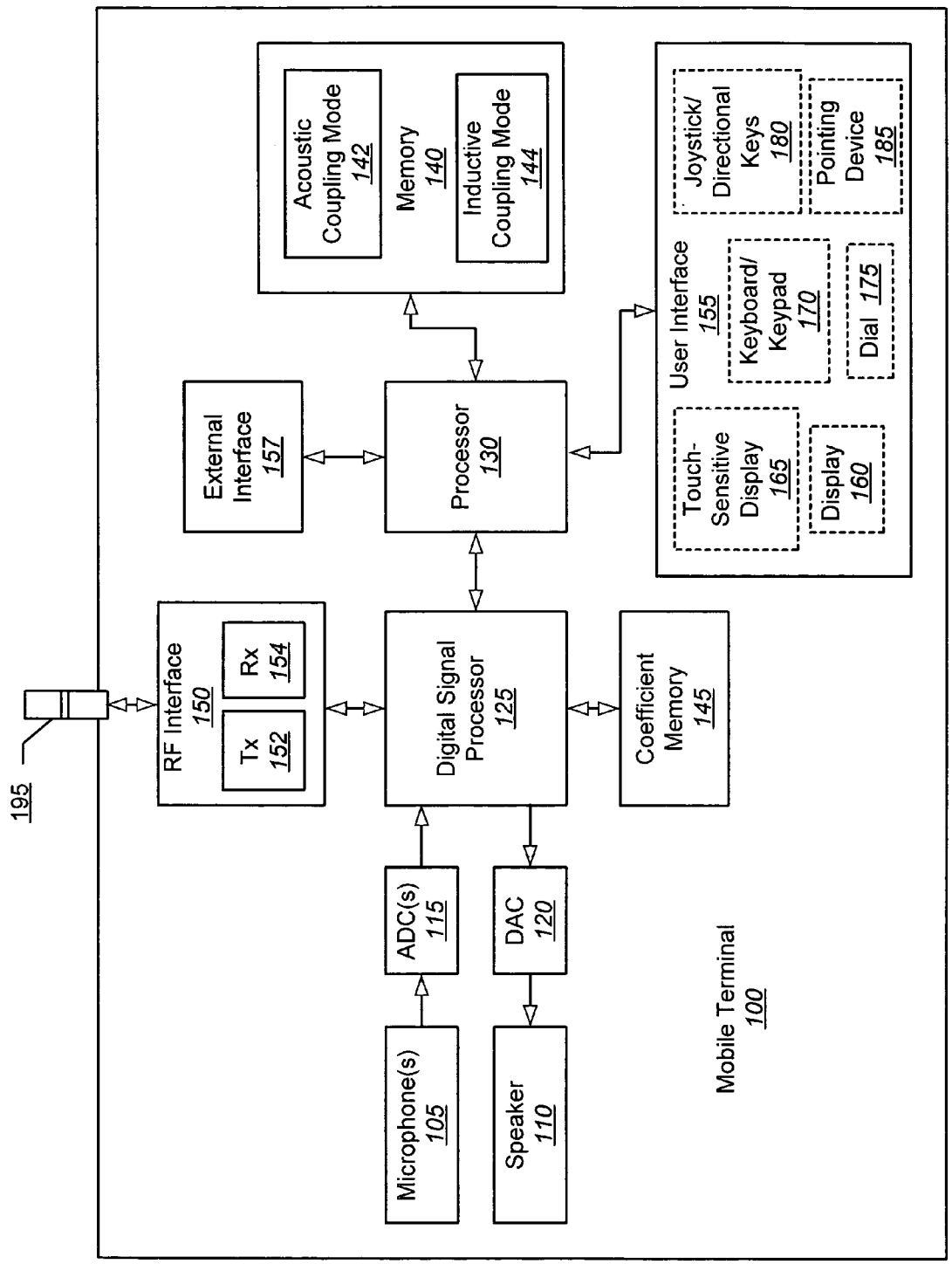
FIG. 1 is a block diagram illustrating a mobile terminal including multiple signal processing modes in accordance with some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM).

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as any electronic device that is capable of receiving and outputting audio signals, such as, for example, a cellular telephone, a portable radio, and/or a portable music player.

Some embodiments of the present invention stem from a realization that an optimum frequency response for inductive coupling to a hearing aid telecoil may be different from an optimum frequency response for acoustic coupling to a human ear. According to some embodiments of the present invention, existing hardware and/or software in a mobile device may be configured provide multiple signal processing modes to enhance hearing aid compatibility (HAC) of the mobile device. In particular, some embodiments of the present invention provide methods, devices, and computer program products for processing a received audio signal using a first set of equalization parameters in an acoustic coupling mode of operation, and using a second set of equalization parameters in an inductive coupling mode of operation. The second set of equalization parameters may be configured to increase the audio magnetic field strength emitted from a mobile device speaker over particular frequency ranges for inductive coupling to a hearing aid telecoil. This increased magnetic field strength may increase the signal-to-noise ratio of the inductive coupling, thereby improving performance for users of telecoil-equipped hearing aids.

FIG. 1 is a block diagram illustrating a mobile terminal 100 that includes multiple signal processing modes for hearing aid compatibility in accordance with some embodiments of the present invention. Referring now to FIG. 1, a mobile terminal 100 includes a microphone 105 and a speaker 110 that are associated with the mobile terminal 100. The microphone 105 is coupled to an analog-to-digital converter 115, and the speaker 110 is coupled to a digital-to-analog converter 120. The interface connecting the microphone 105 and/or the speaker 110 with the mobile terminal 100 may be a wireless interface (such as a Bluetooth interface) to provide hands-free operation, for example, or a wired interface may be used in accordance with various embodiments of the present invention. For example, the speaker 110 may be an external speaker that is associated with the mobile terminal 100, such as a wired or wireless earbud. Alternatively, the speaker 110 may be an earpiece speaker included in a housing of the mobile terminal 100.

The mobile terminal 100 further includes a signal processor, such as a digital signal processor (DSP) 125, that is coupled to a coefficient memory 145. The digital signal processor 125 may include one or more adaptive digital filters, such as finite impulse response (FIR) filters. The digital signal processor 125 is also coupled to a radio frequency (RF) air interface 150 for providing access to a wireless communications network. The RF interface 150 typically includes a transmitter circuit 152 and a receiver circuit 154. The transmitter circuit 152 and the receiver circuit 154 may cooperate to transmit and receive radio frequency signals to and from base station transceivers via an antenna 195. The radio frequency signals transmitted between the mobile terminal 100 and the base station transceivers may include both traffic and control signals (e.g., paging signals/messages for incoming calls), which are used to establish and maintain communication with another party or destination. The radio frequency signals may also include packet data information, such as, for example, cellular digital packet data (CDPD) information.

The mobile terminal 100 also includes a processor 130 that is coupled to the digital signal processor 125 and a memory 140. The memory 140 may represent a hierarchy of memory that may include volatile and/or non-volatile memory, such as removable flash, magnetic, and/or optical rewritable non-volatile memory. The processor 130 is further coupled to a user interface 155 for receiving user input and an external interface 157 for communicating with other electronic devices. The external interface 157 may include, for example, an infrared (IR) transceiver configured to transmit/receive infrared signals to/from other electronic devices. The user interface 155 may include a display 160 (such as a liquid crystal display), a touch sensitive display 165, a keyboard/keypad 170, a dial 175, a joystick/directional key(s) 180, and/or a pointing device 185 (such as a mouse, trackball, touch pad, etc.). However, depending on the particular functionalities offered by the mobile terminal 100, additional and/or fewer elements of the user interface 155 may actually be provided.

The processor 130 may be, for example, a commercially available or custom microprocessor (or processors) that is configured to coordinate and manage operations of the microphone 105, the speaker 110, the digital signal processor 125, the memory 140, the RF interface 150, the external interface 157 and/or the user interface 155. With respect to their role in various conventional operations of the mobile terminal 100, the foregoing components of the mobile terminal 100 may be included in many conventional mobile terminals and their functionality is generally known to those skilled in the art.

In accordance with some embodiments of the present invention, the mobile terminal 100 may include multiple signal processing modes that may be used, for example, for hearing aid compatibility. More specifically, the digital signal processor 125 of the mobile terminal 100 includes an acoustic coupling mode of operation 142 configured for use with a human ear (and/or a hearing aid microphone), and an inductive coupling mode of operation 144 configured for use with a hearing aid telecoil.

Still referring to FIG. 1, the digital signal processor 125 is configured to receive an audio signal, for example, from the RF interface 150, the processor 130, and/or the memory 140. The digital signal processor 125 is configured to process the received audio signal using a first set of equalization parameters in the acoustic coupling mode of operation. The first set of equalization parameters may be a first set of digital filter coefficients selected to provide a frequency response suitable for acoustic coupling to a human ear and/or to a hearing aid microphone. The digital signal processor 125 is further configured to process the received audio signal using a second set of equalization parameters in the inductive coupling mode of operation. The second set of equalization parameters may be a second set of digital filter coefficients selected to provide a frequency response suitable for inductive coupling to a hearing aid telecoil. The speaker 110 is coupled to the digital signal processor 125 and is configured to broadcast the processed audio signal.

The acoustic and inductive coupling modes of operation 142 and 144 may be enabled, for example, via the user interface 155. The user interface 155 may be configured to receive a user selection designating one of the acoustic coupling mode of operation 142 and the inductive coupling mode of operation 144, and, based on the user selection, the digital signal processor 125 may be configured to process the received audio signal using either the first set or the second set of digital filter coefficients. In addition, the mobile terminal 100 may include a hearing aid detector. The hearing aid detector may be configured to automatically detect a presence of the hearing aid telecoil, and the digital signal processor 125 may be configured to process the received audio signal using the second set of digital filter coefficients responsive to the detection.

Although FIG. 1 illustrates an exemplary software and hardware architecture that may be used in a mobile terminal to provide multiple signal processing modes, it will be understood that the present invention is not limited to such a configuration but is intended to encompass any configuration capable of carrying out the operations described herein. For example, although described with reference to a digital signal processor 125, the received audio signal may be processed using any analog and/or digital filtering means configured to provide the desired frequency response. Moreover, although illustrated with reference to a mobile terminal 100, the present invention may be employed in any electronic device that is configured to output an audio signal, for instance, a portable music player (such as an MP3 player) and/or a portable radio.

Figure 2A:
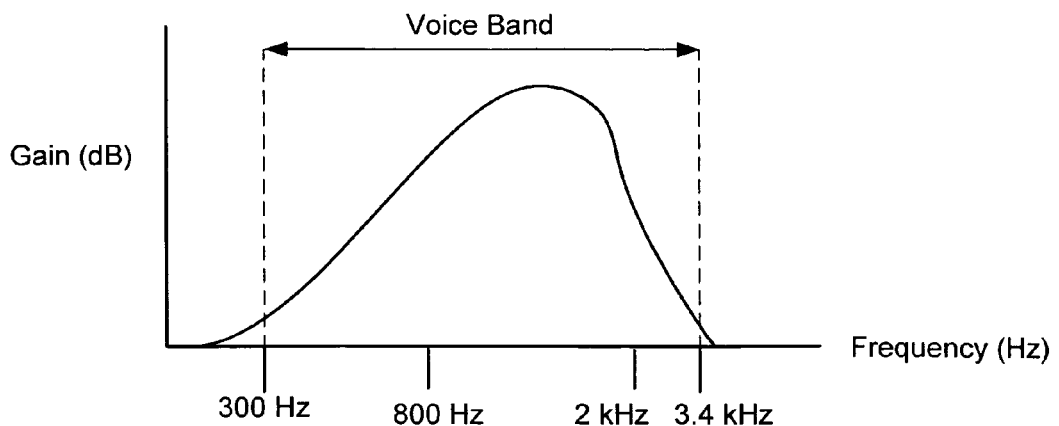
FIG. 2A is a graph illustrating a frequency response of a speaker associated with a mobile device in accordance with some embodiments of the present invention.
Figure 2B:
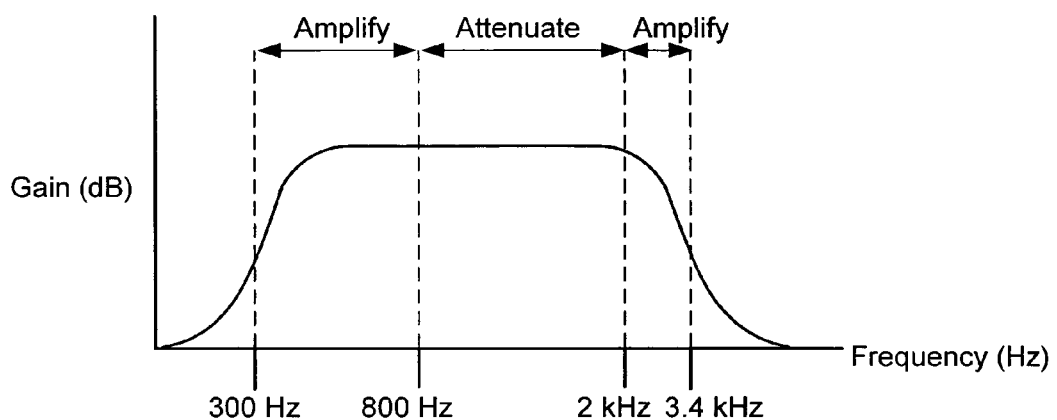
FIG. 2B is a graph illustrating a frequency response of a speaker associated with a mobile device in accordance with some embodiments of the present invention in an acoustic coupling mode of operation.
Figure 2C:
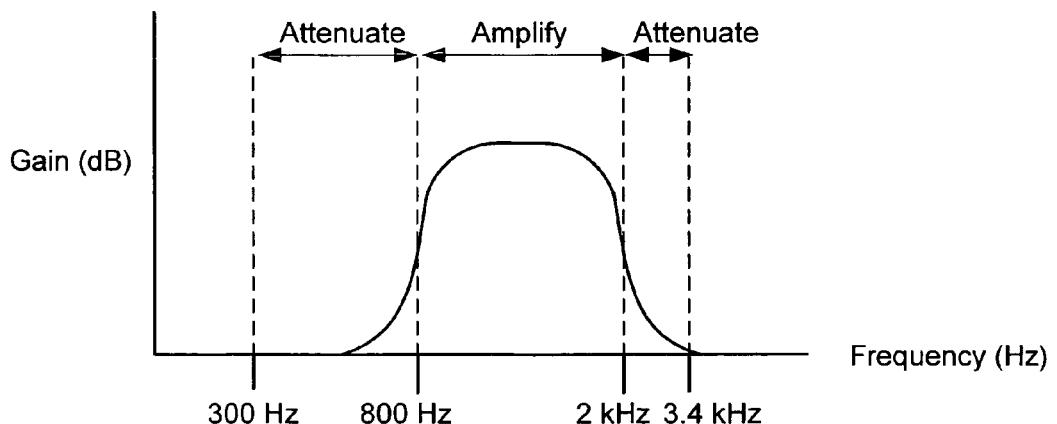
FIG. 2C is a graph illustrating a frequency response of a speaker associated with a mobile device in accordance with some embodiments of the present invention in an inductive coupling mode of operation.

FIGS. 2A-2C are graphs illustrating exemplary frequency responses of a speaker associated with a mobile device in accordance with some embodiments of the present invention. Due to the size requirements of mobile devices, the small transducers that are typically used as speakers may be selected based on size rather than acoustic efficiency and/or desired frequency response. For example, as shown in FIG. 2A, a frequency response for a speaker associated with a mobile device, such as the speaker 110 of FIG. 1, has most of its acoustic energy in a middle frequency range (i.e., around 1 kHz). As such, there is relatively less acoustic energy at lower frequencies (i.e., below about 800 Hz) and at higher frequencies (i.e., above about 2 kHz).

However, industry specifications and/or customer expectations typically require a relatively flat frequency response over the voice band (i.e., over frequencies ranging from about 300 Hz to about 3.4 kHz) for acoustic coupling to a user's ear. As such, signal processing has traditionally been used to reduce signal energy in the middle frequency range and increase signal energy in the upper and lower frequency ranges to obtain the desired flat frequency response over the voice band. In contrast, telecoil specifications typically require most of the magnetic field energy to be centered around the middle frequency range (i.e., around 1 kHz) for inductive coupling to the telecoil. In other words, the requirements for acoustic signal optimization for the human ear may oppose the requirements for magnetic signal optimization for telecoil use.

Accordingly, some embodiments of the present invention provide an acoustic coupling mode of operation using a first set of equalization parameters, and an inductive coupling mode of operation using a second set of equalization parameters. The first set of equalization parameters may be predetermined based on a desired and/or optimal frequency response for acoustic coupling to a hearing aid microphone (and/or a human ear). In contrast, the second set of equalization parameters may be predetermined based on a desired and/or optimal frequency response for inductive coupling to a hearing aid telecoil.

FIG. 2B illustrates an exemplary frequency response provided by a speaker associated with a mobile device according to some embodiments of the present invention in an acoustic coupling mode of operation. Referring now to FIG. 2B, a signal processor, such as the digital signal processor 125 of FIG. 1, is configured (using the first set of equalization parameters) to adjust the frequency levels of the received audio signal to provide a relatively flat frequency response over the 300 Hz to 3.4 kHz voice band. More specifically, the signal processor is configured to amplify frequencies above about 2 kHz and frequencies below about 800 Hz, and attenuate frequencies therebetween. As such, the gain of the received audio signal can be adjusted to provide a desired and/or optimal frequency response for acoustic coupling to a hearing aid microphone and/or a human ear.

FIG. 2C illustrates an exemplary frequency response provided by a speaker associated with a mobile device according to some embodiments of the present invention in an inductive coupling mode of operation. Referring now to FIG. 2C, the signal processor is configured (using the second set of equalization parameters) to adjust the frequency levels of the received audio signal to provide most of the magnetic field energy in the middle frequency range, around 1 kHz. In particular, the signal processor is configured to attenuate frequencies above about 2 kHz and frequencies below about 800 Hz, and amplify frequencies therebetween. As such, the gain of the received audio signal can be adjusted to provide a desired and/or optimal frequency response for inductive coupling to a hearing aid telecoil. More specifically, the midrange magnetic field strength that may be lost when the speaker is tuned for acoustical coupling (using the first set of equalization parameters) can be reclaimed using the second set of equalization parameters. The reclaimed signal level can be in the range of 10-15 dB, which may equate to about twice the loudness or more from the perspective of a human ear. The second set of equalization parameters may be selected to further refine the magnetic output frequency response to meet industry standards. Moreover, products that may fail industry tests when acoustically coupled to a hearing aid microphone using the first set of equalization parameters may pass such tests when inductively coupled to the hearing aid telecoil using the second set of equalization parameters.

Note that, in some instances, the unmodified frequency response of the speaker (i.e., prior to equalization) may match the desired and/or optimal frequency response for inductive coupling to the telecoil. As such, the second set of equalization parameters may be predetermined so as to maintain the frequency levels of the received audio signal when the desired frequency response for the telecoil matches the frequency response of the speaker. In other words, the frequency levels of the received audio signal may not be altered by the signal processor in the inductive coupling mode of operation. For example, the equalization function of the signal processor may be deactivated in the inductive coupling mode of operation when the desired frequency response for the telecoil matches the frequency response of the speaker.

Figure 3:
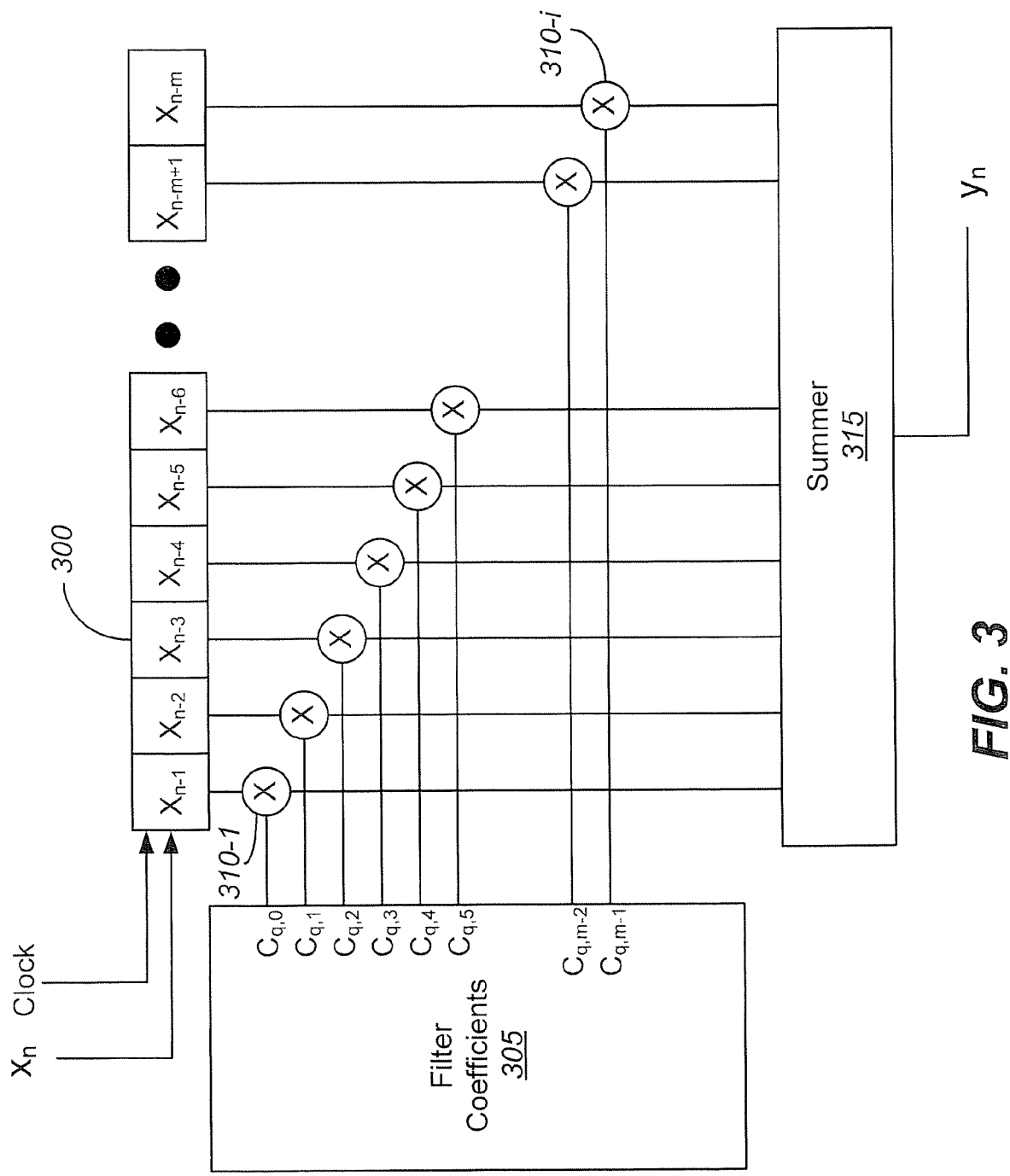
FIG. 3 is a block diagram illustrating a digital filter architecture for use in a mobile device in accordance with some embodiments of the present invention.

FIG. 3 is a block diagram illustrating a digital filter architecture for use in a mobile terminal in accordance with some embodiments of the present invention. The digital filter architecture may be employed in a digital signal processor, for example, the digital signal processor 125 of FIG. 1. In particular, FIG. 3 illustrates the general structure of an adaptive FIR filter. The operation of an FIR digital filter can generally be represented by Equation 1 set forth below:

$$Y_n = \sum_{k=1}^{k=m} C_k^n X_{n-k} \quad \text{EQ. 1}$$

where $Y_n$ is the output at time n, $C_k^n$ is the $k^{th}$ coefficient at time n and $X_{n-k}$ is the input at time n-k. Typically, the collection of samples $X_{n-1}$ through $X_{n-m}$ is stored in a tapped delay line 300. The characteristics of the filter are determined by the values of the coefficients 305 at time n. Each coefficient is also called a tap weight or tap coefficient. The coefficients 305 correspond to the coefficients stored in the coefficient memory 145 of FIG. 1. Each coefficient, $C_k^n$, is used to multiply the respective sample of X(t) through a corresponding multiplier 310-$i$ with the result that $Y_n$ is equal to the sum of the products of the coefficients and the respective m samples of X(t), which is output from a summer 315. This approach of generating output samples $Y_n$ based on a weighted summation of prior-in-time input samples may combat the effects of noise, attenuation, and inter-symbol interference (ISI) due to delay, distortion, and/or other impairments of a communications channel.

The digital signal processor 125 of FIG. 1 may include a series or combination of such adaptive (FIR) filters, whose outputs may be sorted according to frequency and/or amplitude and recombined in further filters to achieve the desired results. More particularly, a first set of digital filter coefficients may be configured for acoustic coupling to a hearing aid microphone and/or a human ear, and a second set of digital filter coefficients may be configured for inductive coupling to a hearing aid telecoil. The first and second sets of digital filter coefficients may respectively correspond to the first and second sets of equalization parameters described above with reference to FIG. 2. As such, the digital signal processor 125 may be programmed with the first set of digital filter coefficients to process the received audio signal in an acoustic coupling mode of operation, and may be programmed with the second set of digital filter coefficients to process the received audio signal in an inductive coupling mode of operation. The digital signal processor 125 may be programmed with one of the first set and the second set of digital filter coefficients responsive to a user selection thereof and/or responsive to detection of the telecoil.

Computer program code for implementing the acoustic and/or inductive coupling modes of operation discussed above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program and/or processing modules may also be implemented using discrete hardware components, one or more application specific integrated circuits (ASICs), or a programmed digital signal processor or microcontroller.

The present invention is described hereinafter with reference to flowchart and/or block diagram illustrations of methods, devices, and computer program products in accordance with some embodiments of the invention. These flowchart and/or block diagrams further illustrate exemplary operations of the mobile terminal and digital signal processor architectures of FIGS. 1 to 3. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
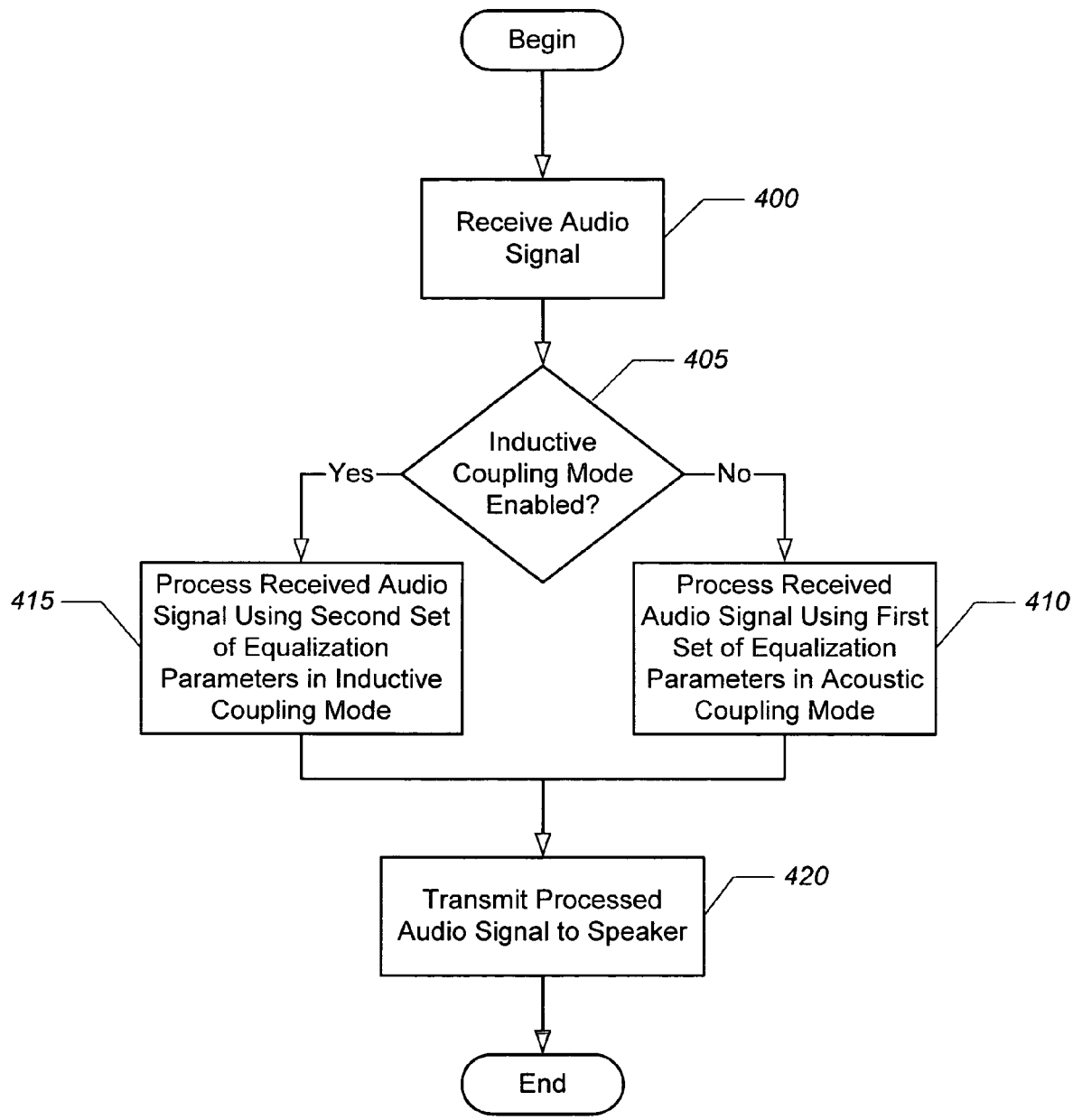

FIG. 4 is a flowchart illustrating exemplary methods for operating a mobile device in multiple signal processing modes in accordance with some embodiments of the present invention. Referring now to FIG. 4, operations begin at block 400 where an audio signal is received at the mobile device. For example, the mobile device may be a cellular telephone, and the audio signal may be an incoming call received via an antenna of the cellular telephone. Also, the mobile device may be a portable music player, and the audio signal may be a music file loaded from a memory storage device of the portable music player. It is then determined whether an inductive coupling mode of operation has been enabled (block 405). The inductive coupling mode of operation may be enabled automatically, for example, responsive to detecting a presence of a hearing aid telecoil within a vicinity of the mobile device. Alternatively, the inductive coupling mode of operation may be enabled responsive to a user input, as described in greater detail with reference to FIG. 5.

Still referring to FIG. 4, if the inductive coupling mode of operation has not been enabled (block 405), the received audio signal is processed using a first set of equalization parameters in an acoustic coupling mode of operation (block 410). The received audio signal may be processed using a signal processor, for example, the digital signal processor 125 of FIG. 1, that is programmed with the first set of equalization parameters. The acoustic coupling mode of operation may be a default mode of operation, and the first set of equalization parameters may be predetermined so as to adjust the frequency levels of the received audio signal based on a desired frequency response for acoustic coupling to a human ear (and/or a hearing aid microphone).

Alternatively, if the inductive coupling mode of operation has been enabled (block 405), the received audio signal is processed using a second set of equalization parameters in the inductive coupling mode of operation (block 415). The inductive coupling mode of operation may be a hearing-aid compatible (HAC) mode of operation, and the second set of equalization parameters may be predetermined so as to adjust the frequency levels of the received audio signal based on a desired frequency response for inductive coupling to a hearing aid telecoil. In some instances, the desired frequency response for the telecoil may match the frequency response of the speaker, and as such, the second set of equalization parameters may be predetermined such that the frequency response of the received audio signal is maintained and/or unaltered. The processed audio signal is then transmitted to a speaker associated with the mobile device (block 420) for broadcast.

FIG. 5 is a flowchart illustrating exemplary methods for operating a mobile device in multiple signal processing modes in accordance with further embodiments of the present invention. Referring now to FIG. 5, operations begin at block 500 where a user selection designating a desired mode of operation is received. For example, the user selection may be received via a user interface, such as the user interface 155 of FIG. 1, and may designate one of the acoustic coupling mode of operation or the inductive coupling mode of operation. If the acoustic coupling mode of operation is designated by the user selection (block 505), a digital signal processor associated with the mobile device, such as the digital signal processor 125 of FIG. 1, is programmed with a first set of digital filter coefficients (block 510). The first set of digital filter coefficients may be predetermined based on a desired and/or optimal frequency response for acoustic coupling to a human ear (and/or a hearing aid microphone).

Alternatively, if the inductive coupling mode of operation is designated by the user selection (block 515), the digital signal processor associated with the mobile device is programmed with a second set of digital filter coefficients (block 520). The second set of digital filter coefficients may be predetermined based on a desired and/or optimal frequency response for inductive coupling to a hearing aid telecoil.

When an audio signal is received at the mobile device (block 525), the received audio signal is processed by the programmed digital signal processor (block 530). As such, the received audio signal is processed using either the first set of digital filter coefficients or the second set of digital filter coefficients, based on the user selection. More specifically, the digital signal processor adjusts the gain of the received audio signal to provide a desired and/or optimal frequency response for acoustic coupling to a human ear (and/or hearing aid microphone), or for inductive coupling to a hearing aid telecoil, depending on the user selection. The processed audio signal is then transmitted to a speaker associated with the mobile device (block 535), such as the speaker 110 of FIG. 1, for broadcast.

The flowcharts of FIGS. 4 and 5 illustrate the architecture, functionality, and operations of embodiments of a mobile device hardware and/or software. In this regard, each block represents a module, segment, or portion of code, which comprises one or more executable instructions for implementing the specified logical function(s). It should also be noted that in other implementations, the function(s) noted in the blocks may occur out of the order noted in FIGS. 4 and 5. For example, two blocks shown in succession may, in fact, be executed substantially concurrently or the blocks may sometimes be executed in the reverse order, depending on the functionality involved.

Thus, according to some embodiments of the present invention, existing hardware and/or software in a mobile device may be enhanced to process a received audio signal using a first set of equalization parameters in an acoustic coupling mode of operation, and using a second set of equalization parameters in an inductive coupling mode of operation. As such, multiple signal processing modes may be provided, and an audio signal may be broadcast that is suitable for acoustic coupling to a human ear/hearing aid microphone or for inductive coupling to a hearing aid telecoil. Accordingly, hearing aid compatibility for the mobile device may be improved.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A method of operating a mobile device for use with an external hearing aid, the method comprising:
    receiving an audio signal;
    processing the received audio signal using a first set of equalization parameters in an acoustic coupling mode of operation for output to a microphone of the external hearing aid and/or a human ear;
    processing the received audio signal using a second set of equalization parameters in an inductive coupling mode of operation for output to a telecoil of the external hearing aid; and
    transmitting the processed audio signal to a speaker associated with the mobile device.

2. The method of claim 1, wherein processing the received audio signal using the first set of equalization parameters comprises adjusting frequency levels of the received audio signal based on a desired frequency response for the hearing aid microphone and/or the human ear, and wherein processing the received audio signal using the second set of equalization parameters comprises adjusting the frequency levels of the received audio signal based on a desired frequency response for the hearing aid telecoil.

3. The method of claim 2, wherein adjusting frequency levels based on a desired frequency response for the hearing aid microphone comprises amplifying frequencies above about 2000 Hz and frequencies below about 800 Hz and attenuating frequencies therebetween.

4. The method of claim 2, wherein adjusting the frequency levels based on a desired frequency response for the hearing aid telecoil comprises attenuating frequencies above about 2000 Hz and frequencies below about 800 Hz and amplifying frequencies therebetween.

5. The method of claim 2, wherein adjusting the frequency levels based on a desired frequency response for the hearing aid telecoil comprises maintaining the frequency levels of the received audio signal when the desired frequency response for the hearing aid telecoil matches the frequency response of the speaker.

6. The method of claim 1, wherein the first set of equalization parameters comprises a first set of digital filter coefficients configured for acoustic coupling to the hearing aid microphone and/or the human ear, and wherein the second set of equalization parameters comprises a second set of digital filter coefficients configured for inductive coupling to the hearing aid telecoil.

7. The method of claim 6, further comprising:
    receiving a user selection designating one of the acoustic coupling mode of operation and the inductive coupling mode of operation,
    wherein processing the received audio signal using the first set of digital filter coefficients and processing the received audio signal using the second set of digital filter coefficients comprises processing the received audio signal using one of the first set and the second set of digital filter coefficients based on the user selection.

8. The method of claim 7, further comprising:
programming a digital signal processor with one of the first set and the second set of digital filter coefficients responsive to receiving the user selection,
wherein processing the received audio signal comprises processing the audio signal using the programmed digital signal processor.

9. The method of claim 6, further comprising:
detecting the hearing aid telecoil within a vicinity of the mobile device,
wherein processing the received audio signal using the second set of digital filter coefficients is responsive to detecting the hearing aid telecoil.

10. The method of claim 1, wherein the mobile device comprises a cellular telephone, a portable radio, and/or a portable music player.

11. A mobile device for use with an external hearing aid, comprising:
a signal processor configured to receive an audio signal and having an acoustic coupling mode of operation and an inductive coupling mode of operation, wherein the signal processor is configured to process the received audio signal using a first set of equalization parameters in the acoustic coupling mode of operation for output to a microphone of the external hearing aid and/or a human ear, and using a second set of equalization parameters in the inductive coupling mode of operation for output to a telecoil of the external hearing aid; and
a speaker coupled to the signal processor and configured to broadcast the processed audio signal.

12. The device of claim 11, wherein the signal processor is configured to adjust frequency levels of the received audio signal based on a desired frequency response for the hearing aid microphone and/or the human ear using the first set of equalization parameters in the acoustic coupling mode of operation, and wherein the signal processor is configured to adjust the frequency levels of the received audio signal based on a desired frequency response for the hearing aid telecoil using the second set of equalization parameters in the inductive coupling mode of operation.

13. The device of claim 12, wherein the signal processor is configured to amplify frequencies above about 2000 Hz and frequencies below about 800 Hz and attenuate frequencies therebetween in the acoustic coupling mode of operation.

14. The device of claim 12, wherein the signal processor is configured to attenuate frequencies above about 2000 Hz and frequencies below about 800 Hz and amplify frequencies therebetween in the inductive coupling mode of operation.

15. The device of claim 12, wherein the signal processor is configured to maintain the frequency levels of the received audio signal in the inductive coupling mode of operation when the desired frequency response for the hearing aid telecoil matches the frequency response of the speaker.

16. The device of claim 11, wherein the signal processor comprises a digital signal processor including at least one digital filter therein, wherein the first set of equalization parameters comprises a first set of digital filter coefficients configured for acoustic coupling to the hearing aid microphone and/or the human ear, and wherein the second set of equalization parameters comprises a second set of digital filter coefficients configured for inductive coupling to the hearing aid telecoil.

17. The device of claim 16, further comprising:
a user interface coupled to the digital signal processor and configured to receive a user selection designating one of the acoustic coupling mode of operation and the inductive coupling mode of operation,
wherein the digital signal processor is configured to process the received audio signal using one of the first set and the second set of digital filter coefficients based on the user selection.

18. The device of claim 17, wherein the digital signal processor is configured to be programmed with one of the first set and the second set of digital filter coefficients responsive to the user selection.

19. The device of claim 16, further comprising:
a hearing aid detector configured to detect the hearing aid telecoil within a vicinity of the mobile device,
wherein the digital signal processor is configured to process the received audio signal using the second set of digital filter coefficients responsive to detection of the hearing aid telecoil.

20. The method of claim 1, wherein the mobile device comprises a cellular telephone, a portable radio, and/or a portable music player.

21. A computer program product for operating a mobile device with an external hearing aid, the computer program product comprising:
a computer readable storage medium having computer readable program code embodied therein, the computer readable program code comprising:
computer readable program code configured to process a received audio signal using a first set of equalization parameters in an acoustic coupling mode of operation for output to a microphone of the external hearing aid and/or a human ear;
computer readable program code configured to process the received audio signal using a second set of equalization parameters in an inductive coupling mode of operation for output to a telecoil of the external hearing aid; and
computer readable program code configured to transmit the processed audio signal to a speaker associated with the mobile device.

22. The computer program product of claim 21, wherein computer readable program code configured to process the received audio signal using the first set of equalization parameters comprises computer readable program code configured to adjust frequency levels of the received audio signal based on a desired frequency response for the hearing aid microphone and/or the human ear, and wherein computer readable program code configured to process the received audio signal using the second set of equalization parameters comprises computer readable program code configured to adjust the frequency levels of the received audio signal based on a desired frequency response for the hearing aid telecoil.

23. The computer program product of claim 22, wherein computer readable program code configured to adjust frequency levels based on a desired frequency response for the hearing aid microphone comprises computer readable program code configured to amplify frequencies above about 2000 Hz and frequencies below about 800 Hz and attenuate frequencies therebetween.

24. The computer program product of claim 22, wherein computer readable program code configured to adjust the frequency levels based on a desired frequency response for the hearing aid telecoil comprises computer readable program code configured to attenuate frequencies above about 2000 Hz and frequencies below about 800 Hz and amplify frequencies therebetween.

25. The computer program product of claim 22, wherein computer readable program code configured to adjust the frequency levels based on a desired frequency response for the hearing aid telecoil comprises computer readable program code configured to maintain the frequency levels of the received audio signal when the desired frequency response for the hearing aid telecoil matches the frequency response of the speaker.

26. The computer program product of claim 21, wherein the first set of equalization parameters comprises a first set of digital filter coefficients configured for acoustic coupling to the hearing aid microphone and/or the human ear, and wherein the second set of equalization parameters comprises a second set of digital filter coefficients configured for inductive coupling to the hearing aid telecoil.

27. The computer program product of claim 26, further comprising:
    computer readable program code configured to receive a user selection designating one of the acoustic coupling mode of operation and the inductive coupling mode of operation,
    wherein computer readable program code configured to process the received audio signal using the first set of digital filter coefficients and computer readable program code configured to process the received audio signal using the second set of digital filter coefficients comprises computer readable program code configured to process the received audio signal using one of the first set and the second set of digital filter coefficients based on the user selection.

28. The computer program product of claim 27, further comprising:
    computer readable program code configured to program a digital signal processor with one of the first set and the second set of digital filter coefficients responsive to the user selection,
    wherein computer readable program code configured to process the received audio signal comprises computer readable program code configured to process the audio signal using the programmed digital signal processor.

29. The computer program product of claim 26, further comprising:
    computer readable program code configured to detect the hearing aid telecoil within a vicinity of the mobile device,
    wherein computer readable program code configured to process the received audio signal using the second set of digital filter coefficients is executed responsive to detection of the hearing aid telecoil.

30. The computer program product of claim 21, wherein the mobile device comprises a cellular telephone, a portable radio, and/or a portable music player.

\* \* \* \* \*

UNITED STATES PATENT AND TRADEMARK OFFICE
CERTIFICATE OF CORRECTION

PATENT NO. : 7,634,098 B2  Page 1 of 1
APPLICATION NO. : 11/188559
DATED : December 15, 2009
INVENTOR(S) : Townsend et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1177 days.

Signed and Sealed this

Ninth Day of November, 2010

David J. Kappos
*Director of the United States Patent and Trademark Office*